United States Patent [19]

Zweigle

[11] 4,229,572
[45] Oct. 21, 1980

[54] PURIFICATION OF CELLULOSE ETHER REACTION PRODUCT

[75] Inventor: Maurice L. Zweigle, Midland, Mich.

[73] Assignee: The Dow Chemical Company, Midland, Mich.

[21] Appl. No.: 17,520

[22] Filed: Mar. 5, 1979

[51] Int. Cl.$^3$ .............................................. C08B 11/20
[52] U.S. Cl. ...................... 536/89; 536/84; 536/85; 536/91; 536/94; 536/100
[58] Field of Search ............... 536/85, 84, 89, 91, 536/94, 100, 43

[56] References Cited

U.S. PATENT DOCUMENTS

| | | | |
|---|---|---|---|
| 1,990,904 | 2/1935 | Hahn | 536/100 |
| 2,067,946 | 1/1937 | Picton | 536/99 |
| 2,118,664 | 5/1938 | Bradshaw | 536/89 |
| 2,236,533 | 4/1941 | Hahn | 536/100 |
| 2,488,631 | 11/1949 | Kunz | 536/89 |
| 2,744,894 | 5/1956 | Benedict et al. | 536/95 |
| 2,976,278 | 3/1961 | Paddison et al. | 536/98 |
| 3,347,847 | 10/1967 | Engelskirchen et al. | 536/85 |
| 3,903,076 | 9/1975 | Krumel et al. | 536/85 |

OTHER PUBLICATIONS

Chemical Abstracts, vol. 76, No. 26, Jun. 26, 1972, p. 155875g.
Chemical Abstracts, vol. 78, No. 10, Mar. 12, 1973, p. 60323c.
Chemical Abstracts, vol. 79, No. 12, Sep. 24, 1973, p. 68065m.

*Primary Examiner*—Ronald W. Griffin

[57] ABSTRACT

In the preparation of organosoluble cellulose ethers, the content of alkali metal (hydroxides and the salts thereof) in the resulting cellulose ether is reduced by forming a solution of the cellulose ether and an organic solvent, converting the alkali metal hydroxide therein to an alkali metal salt and heating the resulting solution at conditions sufficient to (1) increase the size of the alkali metal salt particles and (2) remove any water therefrom. Filtering the resulting mixture and drying the filtrate yields a cellulose ether containing a very small percentage of alkali metal salt, e.g., often less than about 500 ppm.

17 Claims, No Drawings

4,229,572

PURIFICATION OF CELLULOSE ETHER REACTION PRODUCT

BACKGROUND OF THE INVENTION

The present invention relates to a method for reducing the content of alkali metal in an organo-soluble cellulose ether.

Organosoluble cellulose ethers such as ethyl cellulose and benzyl cellulose are known to be particularly useful in a wide variety of applications including the preparation of molded articles, e.g., extruded films or tubes, and as a component in protective coatings, adhesives, lacquers and ink or binder compositions.

Conventionally, the organosoluble cellulose ethers are generally prepared by the reaction of an alkali cellulose (typically, the reaction product of a cellulose and an alkali metal hydroxide) with an etherifying agent, e.g., ethyl chloride or ethyl oxide, in the presence of a reaction diluent such as toluene. The resulting cellulose ether is conventionally recovered from the reaction medium by desolvating the reaction product, thereby forming solid particles of the cellulose ether, converting any alkali metal hydroxide to salt form and washing the cellulose ether particles several times with water to remove the soluble alkali metal salts and other impurities therefrom. The washed cellulose ether is then dewatered and dried. Unfortunately, to remove the necessary amount of the alkali metal salt by conventional methods requires large amounts of water, e.g., about 5 to 40 times the weight of the cellulose ether, from which water the cellulose ether must be recovered. As such, substantial expenditures of time, energy and apparatus are necessary to effectively produce a purified cellulose ether.

Heretofore, several methods for preparing a cellulose ether having a low alkali metal salt content have been proposed. For example, U.S. Pat. No. 2,744,894 teaches that purified hydroxyalkyl ethers of polysaccharides can be prepared by etherifying the cellulose in a proper reaction diluent, e.g., a solvent mixture of a benzenoid hydrocarbon and a monhydric alcohol, and extracting the alkali metal salts from the polysaccharide ethers prepared therein using a suitable rinse solvent such as a mixture of methanol and acetone. While the disclosed method eliminates the necessity of a water wash, it is undesirable for the reason that large amounts of the rinse solvent mixture are required to obtain a cellulose ether with the desired purity.

Alternatively, as disclosed in U.S. Pat. No. 3,347,847; the alkali metal salts are removed from a conventionally prepared hydroxyethyl cellulose by treating, i.e., cross-linking, the cellulose with glyoxal at an acid pH and subsequently washing the treated cellulose with water at a pH of from about 2 to about 6. Unfortunately, this method stills requires large amounts of wash water, e.g., about 2 to 50 times the weight of the cellulose ether. Improvements to the aforementioned method are disclosed in U.S. Pat. No. 3,903,076 which teaches that following etherification in a proper reaction diluent, the excess alkali metal hydroxide is neutralized and the water and water-soluble hydroxyl containing by-products removed therefrom by azeotropic distillation. The etherified cellulose is then cross-linked and washed with water. Although the azeotropic distillation effectively removes the hydroxyl containing ingredients, e.g., monoethers of glycol, the disclosed method does not substantially improve the prior art methods for reducing the alkali metal salt content in the cellulose ether.

Moreover, none of the disclosed methods are particularly useful in the preparation of purified organo-soluble cellulose ethers.

In view of the stated deficiencies of the prior art, it remains highly desirable to provide a method for effectively reducing the amount of alkali metal, in the form of a hydroxide or salt, from an organosoluble cellulose ether.

SUMMARY OF THE INVENTION

Accordingly, the present invention is a method for reducing the content of alkali metal, in salt or hydroxide form, in an organosoluble cellulose ether. In said method, a solution of the cellulose ether, which cellulose ether contains alkali metal, and an organic solvent is prepared. The alkali metal hydroxide present in the solution is converted to an alkali metal salt and the resulting solution subsequently heated at conditions such that (1) any water present in the solution is removed and (2) the alkali metal salt particles grow larger in size. The enlarged salt particles and the cellulose ether are subsequently separated.

Surprisingly, the particles of the alkali metal salt are enlarged sufficiently by the method of this invention that they are easily removed from the cellulose ether solution by conventional physical separation techniques, e.g., filtration. More importantly, the alkali metal salt content of the cellulose ether treated by the methods of this invention is relatively small. Often, the cellulose ether contains as little as 0.04 weight percent of the alkali metal salt.

In a preferred embodiment, the present invention is an improved method for preparing a cellulose ether, wherein an alkali cellulose and an etherifying agent are contacted at conditions sufficient to form a cellulose ether and the cellulose ether is recovered from the remainder of the reaction medium. The improvement in said method comprises forming a solution of the cellulose ether, which cellulose ether contains alkali metal, in salt or hydroxide form, and an organic solvent at some time prior to the recovery of the cellulose ether. The alkali metal hydroxide in the solution is converted to an alkali metal salt with an acid and the resulting solution heated at conditions sufficient to remove any water present in the solution and enlarge the salt particles. The enlarged salt particles are thereafter separated from the cellulose ether solution.

The cellulose ethers prepared in accordance with the present invention are useful as additives in the preparation of molded articles and as a component in protective coatings, adhesives, binder compositions, ink formulations and lacquers.

DETAILED DESCRIPTION OF THE PREFERRED EMBODIMENTS

In the practice of this invention, a solution of an organosoluble cellulose ether and an organic solvent is prepared.

As used herein, the term "organic solvent" refers to a normally liquid organic material in which at least a measurable amount of the cellulose ether is soluble. By "soluble" is meant that the cellulose ether and organic solvent form a true solution, i.e., individual molecules of the cellulose ether are dispersed in the organic solvent. Advantageously, the organic solvent and cellulose ether can form a solution which solution contains at least about 5, preferably at least about 20, weight percent of the cellulose ether based on the total weight of the solution.

Representative of such organic solvents include saturated aliphatic and inertly substituted, saturated aliphatic hydrocarbons, either straight or branched chain, having about 5 or more carbon atoms and advantageously having a boiling point from about 70° to about 150° C. such as hexane, heptane, octane and the like; alicyclic or inertly substituted alicyclic hydrocarbons having 5 or 6 carbon atoms in the ring such as cyclohexane; aromatic and inertly substituted aromatic hydrocarbons, advantageously with a boiling point from about 70° to about 170° C., such as benzene, toluene, ethyl benzene, xylene and the like; ketones such as acetone, methyl ethyl ketone, diethyl ketone, methyl propyl ketone, isobutyl ketone and the like; alcohols such as methanol and isopropyl t-butyl alcohol; and chlorinated solvents such as ethylene dichloride, methylene chloride and benzyl chloride.

Advantageously, the organic solvent employed in this invention can also be employed as a reaction diluent useful in the preparation of the cellulose ether, i.e., the organic solvent is slightly miscible in water and is essentially inert to the reactants, the reaction product and the reactions being conducted. Of such organic solvents; hexane, toluene, benzene, xylene, acetone and ethylene dichloride are preferred; with hexane, toluene and benzene being most preferred.

For the purposes of this invention, the term "organosoluble cellulose ether" is used conventionally and refers to those cellulose ethers which are soluble in one or more organic solvents. In general, those cellulose ethers conventionally characterized as being organosoluble, e.g., ethyl cellulose, ethyl hydroxyethyl cellulose, cyanoethyl cellulose and benzyl cellulose, are advantageously employed in this invention. Typically, such cellulose ethers have a degree of substitution (generally ethoxyl) of equal to or greater than about 2.0. Preferably, in the practice of this invention, the organosoluble cellulose ether is ethyl cellulose or benzyl cellulose, with ethyl cellulose being especially preferred.

Methods for preparing the organosoluble cellulose ethers and the kinds and proportions of the reactants (i.e., the cellulose, the alkali metal hydroxide and the etherifying agent), the reaction diluent, catalysts and the like are well known and reference is made thereto for the purposes of this invention. Illustrative of such methods are U.S. Pat. Nos. 2,163,869; 2,249,673, 2,254,249; 3,903,076 and Cellulose and Cellulose Derivatives, Part II, edited by E. Ott, H. M. Spurlin, and M. W. Grafflin, published in 1954 by Interscience Publishers, Inc. New York, pages 915–920, all of which are hereby incorporated by reference. Generally, in the disclosed methods for preparing cellulose ethers, an alkali cellulose (typically, prepared from a cellulose and an alkali metal hydroxide) is reacted with an etherifying agent to form the desired cellulose ether.

In one conventional method, the preparation of the cellulose ether comprises a two-step process wherein the first step is the preparation of the alkali cellulose. Methods for preparing the alkali cellulose are well known and reference is made thereto for the purpose of this invention. Illustrative of such methods are U.S. Pat. Nos. 2,143,855; 2,143,863, 2,145,862; 2,149,309 and 2,149,310; all of which are hereby incorporated by reference. Generally, in the disclosed methods, the alkali cellulose is prepared by contacting the cellulose material, in sheet or fibrous shred form, with an excess amount of aqueous solution of from about 50 to about 70 weight percent alkali metal hydroxide, at an elevated temperature, e.g., from about 55° to 130° C. Typically, the resulting alkali cellulose is then removed from the alkali metal hydroxide solution using pressure or evaporation.

The desired cellulose ether is then prepared by reacting the resulting alkali cellulose with an etherifying agent in the presence of an alkali metal hydroxide (typically, sodium hydroxide) in an oxygen free atmosphere. Etherifying agents generally employed include alkyl monochlorides such as ethyl chloride and monochloropropane or -butane; vicinal epoxides such as ethylene oxide, 1,2-propylene oxide and 1,2-butylene oxide; and monochlorocarboxylic acids or alkali metal salts thereof such as monochloro-substituted acetic, propionic or butyric acid. Optionally, a reaction diluent, generally an organic liquid in which the cellulose ether is soluble, is employed. This reactant mixture is thoroughly agitated at elevated temperatures, e.g., 120° to 130° C., until reaction is complete.

In a second conventional method for preparing the cellulose ether, the alkali cellulose and the corresponding cellulose ether are prepared in situ, i.e., both the alkali cellulose and cellulose ether are prepared in a single reaction vessel (a one-stage process) without intermediate product purification between the preparation of the alkali cellulose and the subsequent preparation of the cellulose ether. Typically, in such method, the cellulose, advantageously, in a finely distributed form, is dispersed in a reaction diluent, generally an inert organic liquid in which the cellulose ether is soluble and which is at least partially water miscible. The desired amounts of an aqueous solution of an alkali metal hydroxide, preferably from about 300 to about 400 weight percent alkali metal hydroxide, based on the weight of the cellulose ether is added to the resulting dispersion. After a sufficient time period, an etherifying agent is added to the mixture. Generally, during the entire process, the mixture is maintained in an oxygen-free atmosphere, and at elevated temperatures, e.g., 130° to 135° C., while being thoroughly agitated.

Using either method, following completion of the reaction, the reaction vessel will generally contain a mixture of the cellulose ether, water, a salt of the alkali metal hydroxide, unreacted (1) alkali metal hydroxide and (2) etherifying agent and any by-products formed during the etherification reaction, e.g., the alcohol and ether corresponding to the etherifying agent. The term "reaction medium" will be used herein to describe this mixture.

As noted, the etherification reaction is generally carried out in an organic liquid reaction diluent. In general, the diluent can also be employed as the organic solvent as that term is used herein. As such, the cellulose ether is not normally recovered from the reaction medium prior to being treated by the methods of this invention, i.e., the reaction diluent serves as at least a portion of the organic solvent.

Alternatively, if the cellulose ether is prepared in a reaction diluent which cannot be suitably employed as an organic solvent, the cellulose ether is advantageously recovered therefrom by conventional techniques and the recovered cellulose ether mixed with a suitable organic solvent. Similarly, if the cellulose ether is prepared neat, i.e., no reaction diluent is employed, the cellulose ether must be mixed with a suitable organic solvent prior to being treated by the methods of this invention.

The amounts of the cellulose ether and organic solvent most advantageously employed in the preparation of a solution thereof are dependent on a variety of factors, including the type of cellulose ether, organic solvent and alkali metal hydroxide employed; and the desired alkali metal content of the purified cellulose ether. Advantageosuly, sufficient amounts of the organic solvent are employed to dissolve essentially all the cellulose ether. In general, the desired results are obtained when the organic solvent is employed at from about 5 to about 12, preferably from about 6 to about 8, times the weight of the cellulose ether. In general, the reaction product contains substantial amounts of water, e.g., about 2 to about 4 weight percent based on the weight of the cellulose ether, and, in such case, the organic solvent is preferably employed in an amount which provides an azeotropic composition or constant boiling composition of the organic solvent and the water.

In the practice of this invention, the alkali metal hydroxide is generally converted to an alkali metal salt by contacting the hydroxide with an acid. The acids useful herein are acids which form a salt when contacted with the alkali metal hydroxide, which salt, when subjected to the methods of this invention, grows in size, i.e., the particle size thereof increases. Preferably, such growth is sufficient to allow for the removal of the salt from the remainder of the solution by standard physical separation techniques, e.g., filtration or centrifugation. Representative of such acids are the mineral acids such as hydrochloric acid, sulfuric acid, phosphoric acid and the like, with hydrochloric acid being the most preferred. Advantageously, a highly concentrated form of the acid is employed, with the anhydrous form being most advantageously employed herein.

The acid is advantageously employed in an amount sufficient to convert essentially all the alkali metal hydroxide in the solution of the cellulose ether and organic solvent to an alkali metal salt. Preferably, the acid is employed in an amount in a slight excess, e.g., about 1 to 10 weight percent, of the amount required to convert 100 percent of the alkali metal hydroxide to an alkali metal salt. As an example, when a highly concentrated mineral acid is added to a cellulose ether solution of a reaction product consisting of from about 2 to about 3 weight percent water, sufficient amounts of the acid are advantageously added to adjust the pH of the solution to at least about 6.5, with a pH of at least about 6 being preferred.

Optionally, a flocculant, i.e., a substance which induces the aggregation of suspended solid particles into a larger particle, can be added to the solution of the cellulose ether to facilitate growth of the salt particles. Representative examples of flocculants useful in the practice of this invention include the inorganic flocculants such as lime, alum, ferric chloride and the like; and the organic flocculants including multivalent polyelectrolytes such as polyethylene imine, polyacrylic acid salts, polyacrylamide, copolymers of acrylamide and acrylic acid and the quaternized Mannich derivative of a polyacrylamide, preferably having a low molecular weight, e.g., number average molecular weight from about 1000 to about 10,000. A preferred flocculant is the quaternized Mannich derivative of a low molecular weight polyacrylamide.

The flocculant is advantageously employed in an amount sufficent to increase the particle size of the alkali metal salt when said particle size is compared to the particle size of the alkali metal salt of an identically treated cellulose ether solution which contains no flocculant. The amount of the flocculant most advantageously employed is dependent on many factors including the specific flocculant employed, the composition of the reaction product, and the desired particle size of the alkali metal salt. In general, concentrations from about 0.1 to about 2, preferably from about 0.5 to about 1, weight percent based on the total weight of the reaction product are effectively employed.

In the normal practice of this invention, the alkali metal content of the cellulose ether is reduced by contacting the solution of the cellulose ether which contains the alkali metal, organic solvent and, optionally, the flocculant, with the hereinbefore specified amounts of acid, heating the resulting acidified solution (i.e., the solution of the cellulose ether following the addition of the acid thereto) at conditions sufficient to (1) remove any water present in the solution and (2) promote the growth of the alkali metal salt particles and subsequently recovering the cellulose ether essentially free of the enlarged salt particles. By the term "reduce the content of the alkali metal" it is meant that the alkali metal content (in the form of an alkali metal salt) in a cellulose ether treated in accordance with the method of this invention is reduced by an amount measurable using a conventional test method, e.g., a chloride ion sensitive electrode such as Model No. 94-17 sold by Orion Research, when compared to the alkali metal content of a cellulose ether prepared by an identical method, but which is not subsequently purified, i.e., the cellulose ether reaction product is recovered by simply devolatilizing the reaction product. Advantageously, the alkali metal salt content is measurably less than a similarly prepared cellulose ether which, following preparation, is purified by desolvating the reaction product and washing the desolvated cellulose ether with an amount of water from about 2 to about 20 times its weight. Preferably, the alkali metal salt content is less than about 0.5, more preferably less than 0.1, most preferably less than about 0.05 percent of the total weight of the cellulose ether.

The conditions at which the cellulose ether solution containing the alkali metal salt is most advantageously heated will vary depending on the type and proportion of the cellulose ether, the organic solvent, the reaction by-products and the content of the alkali metal desired in the final cellulose ether. Generally, the solution is advantageously heated to a temperature at which it boils, while allowing the volatile material to escape. Typically, temperatures between about 80° and about 110° C., more typically, between about 83° and about 105° C., are employed to boil the solution. Generally, at such temperatures, any of the alcohol which corresponds to the etherifying agent employed in preparing the cellulose ether is removed with the water. Such removal of alcohol is desirable for the purposes of this invention. In general, the boiling temperatures are maintained for a period of time sufficient to remove essentially all, i.e., at least about 90 weight percent, of the water from the reaction product and to allow the particle size of the alkali metal salt to increase to a size sufficient to provide easy removal of the salt particles from the remainder of the cellulose ether solution using conventional physical separation techniques, e.g., filtration or centrifugation. In general, the size, i.e., primary particle dimension, of the salt particles is advantageously greater than about 0.5 μm, preferably greater than about 0.8 μm, more preferably greater than about 1.0 μm, most preferably greater than about 1.5 μm. This time period will vary depending on a variety of factors such as the original amount of water, the organic solvent employed, the desired size of the salt particles and the like. In general, while the water is generally removed in from about 30 to about 45 minutes, the reaction product is generally maintained at the elevated temperature for a period of from about 1 to about 3, preferably from about 1 to about 2, hours to provide for sufficient growth of the salt particles.

Following the removal of the water from the cellulose ether solution and sufficient growth of the salt particles, the enlarged salt particles are advantageously removed from the reaction product, which has advantageously been previously cooled, by conventional physical separation techniques such as filtration or centrifugation. For example, the enlarged alkali metal salt particles have been found to be effectively removed from the cellulose ether solution by a No. 1 filter paper sold by Whatman Inc., precoated with Filter Cell ® to a thickness of about 0.32 cm.

After removal of the alkali metal salt from the solution of the cellulose ether, the cellulose ether is recovered from the remainder of the solution by the devolatilization thereof, advantageously by heating the filtered solution to a temperature from about 40° to about 60° C. until an essentially dry, normally solid cellulose ether is obtained.

The following examples are set forth to illustrate the embodiments of the present invention and should not be construed to limit its scope. In the examples, all parts and percentages are by weight unless otherwise indicated.

EXAMPLE 1

To a 10 l. pressure vessel equipped with an addition funnel, heating and cooling means, thermometer and agitator is added 400 g of ground cellulose and 608 g of an aqueous solution of 73 weight percent sodium hydroxide. The pressure vessel is evacuated and flushed with nitrogen. To the vessel is then added 320 g of toluene which has first been purged with nitrogen to remove any dissolved oxygen. The resulting mixture is mildly agitated and the vessel is heated to a temperature of 120° C. and maintained at this temperature for a one-hour period.

At the end of this period, 2800 g of ethyl chloride is charged to the reactor. The temperature of the vessel is raised to about 135° C. and is maintained at this temperature for a period of about 10 hours. The vessel is cooled to 25° C. at the end of this period and subsequently vented. The reaction product is found to contain about 2 percent sodium hydroxide, using the silver nitrate titration technique.

A 500 g-portion (Sample No. 1) of the reaction medium is transferred to a 3 l. flask equipped with a thermometer, heating and cooling means, agitator and distillation means. To the flask is then added an equal portion, by volume (about 400 ml), of toluene. Subsequent thereto, sufficient anhydrous hydrochloric acid (about 9 g) is added to convert the sodium hydroxide to sodium chloride; the resulting solution having a pH of about 6. The solution is then heated to about 120° C., which causes the solution to boil. Boiling of the solution is maintained for a period sufficient to remove any water from the flask by distillation (about 60 minutes). During this distillation, toluene is added to the flask at a rate sufficient to maintain the initial volume of the flask.

After removal of essentially all the water, the flask is heated at a temperature of 105° C. for an additional 30-minute period. At the end of this period, the flask is cooled to 25° C. and filtered through No. 1 filter paper sold by Whatman Inc., precoated with Filter Cell ® to a thickness of 0.32 cm to remove the salt particles. Following filtration, the filtrate is dried by heating to a temperature of 60° C. and maintaining said temperature for 90 minutes. The dried filtrate is ethyl cellulose having a viscosity of 100 centipoises as a 5 weight percent solution in an 80/20 by volume toluene/ethanol mixture as measured by a Ubbelhode viscometer (1.1 mm inside diameter) at 25° C. and an ethoxy degree of substitution of 2.8. It is found to contain 0.04 percent sodium in the chloride salt form.

A second portion (Sample No. C-1) of the reaction medium is treated in a similar manner as Sample No. 1 except that it is not distilled, i.e., the cellulose ether solution is heated but water is not removed therefrom. Upon drying the filtrate, it is found to contain 3.5 percent sodium in the chloride salt form.

Another sample of the cellulose ether solution (Sample No. C-2) is treated in a manner similar to Sample No. C-1 except that the solution is centrifuged at about 1800 revolutions per minute for 2 hours rather than being filtered. The recovered ethyl cellulose is found to contain 3.5 percent sodium in the chloride salt form.

Yet another sample of the ethyl cellulose is recovered using a more conventional technique. The reaction medium is desolvated by heating the reaction product to a temperature of about 105° C. for a period of about 10 minutes. About 10 g of the desolvated material (consisting of ethyl cellulose, sodium hydroxide and sodium chloride) is slurried in about 60 g water and sufficient hydrochloric acid added thereto to convert the sodium hydroxide to sodium chloride, the pH of the resulting slurry being 6.5. The desolvated material is then washed three times with water, each wash consisting of 60 g of water. The washed material is then dried by heating for about 70 minutes at 60° C. The dried ethyl cellulose is found to contain 0.12 percent sodium chloride salt.

As evidenced by this example, the content of the alkali metal in ethyl cellulose is effectively reduced when the cellulose ether is purified by the methods of this invention.

EXAMPLE 2

An ethyl cellulose having a reduced alkali metal salt content is prepared by the method of this invention following the procedure of Example 1 except that 0.75 weight percent, based on the weight of the reaction product, of a flocculant of quaternized Mannich product of a polyacrylamide having a number average molecular weight of 2000 as determined by solution viscosity correlation methods was added to the cellulose ether solution prior to distilling off the water.

Due to the presence of the flocculant, the salt particles grow visibly larger in size than in Example 1. When filtered by a precoated filter paper (0.32 cm Filter Cell ®), the resulting ethyl cellulose is found to contain 0.04 percent sodium in the chloride salt form.

What is claimed is:

1. A method for reducing the content of alkali metal, in salt or hydroxide form, in an organosoluble cellulose ether, said method comprising
   a. preparing a solution of the cellulose ether, which cellulose ether contains alkali metal, and an organic solvent;
   b. converting the alkali metal hydroxide present in the solution to an alkali metal salt;
   c. heating the resulting solution at conditions such that (1) any water present in the solution is removed therefrom and (2) the alkali metal salt particles grow; and
   d. separating the cellulose ether from the enlarged salt particles.

2. The method of claim 1 wherein the organosoluble cellulose ether is ethyl cellulose, ethylhydroxy ethyl cellulose, cyanoethyl cellulose or benzyl cellulose.

3. The method of claim 1 wherein the organic solvent is an organic liquid which can dissolve at least about 20 weight percent of the cellulose ether, said weight percent being based on the total weight of the solvent and cellulose ether.

4. The method of claim 3 wherein the organic solvent is hexane, toluene, benzene, xylene, acetone or ethyl dichloride.

5. The method of claim 1 wherein the alkali metal hydroxide is converted to an alkali metal salt by contacting the hydroxide with an amount of an acid sufficient to convert essentially all the hydroxide to salt form.

6. The method of claim 5 wherein the acid is hydrochloric, phosphoric or sulfuric acid.

7. The method of claim 5 wherein the acidified solution is heated to temperatures between about 80° C. and about 110° C. while allowing any volatile material to escape.

8. The method of claim 1 wherein the organic solvent is employed in an amount from about 5 to about 12 times the weight of the cellulose ether.

9. The method of claim 1 wherein a flocculant is combined with the solution of the cellulose ether and organic solvent prior to heating the solution.

10. The method of claim 9 wherein the flocculant is an organic flocculant of a multivalent polyelectrolyte.

11. The method of claim 7 wherein the cellulose ether is ethyl cellulose, the acid is hydrochloric acid and the organic solvent is hexane, toluene or benzene.

12. An improved method for preparing a cellulose ether wherein an alkali cellulose is contacted with an etherifying agent at conditions sufficient to form a cellulose ether and the cellulose ether is then recovered from the remainder of the reaction medium, the improvement in said method comprising:
   a. forming a solution of the cellulose ether, which cellulose ether contains alkali metal in salt or hydroxide form, and an organic solvent at some time prior to recovering the cellulose ether from the remainder of the reaction medium;
   b. converting the alkali metal hydroxide in the solution to an alkali metal salt by contacting the alkali metal hydroxide with an acid;
   c. heating the resulting solution at conditions such that the water is removed therefrom and the particles of the alkali metal salt grow; and
   d. separating the enlarged salt particles from the remainder of the solution.

13. The improved method of claim 12 further comprising the step of devolatilizing the separated solution.

14. The improved method of claim 12 wherein the reaction medium contains the cellulose ether, water, an alkali metal hydroxide and a salt thereof and an alcohol and ether corresponding to the etherifying agent.

15. The improved method of claim 14 wherein the cellulose ether is ethyl cellulose or benzyl cellulose and the acid is an inorganic mineral acid.

16. The improved method of claim 15 wherein the cellulose ether is ethyl cellulose, the inorganic mineral acid is hydrochloric acid and the organic solvent is hexane, toluene or benzene.

17. The improved method of claim 16 wherein the neutralized solution is heated to temperatures between about 80° C. and about 110° C., while allowing the vaporized material to escape.

* * * * *